US009526096B2

(12) United States Patent
Lee et al.

(10) Patent No.: US 9,526,096 B2
(45) Date of Patent: Dec. 20, 2016

(54) PDCCH MONITORING SCHEME CONSIDERING EPDCCH

(71) Applicant: LG ELECTRONICS INC., Seoul (KR)

(72) Inventors: Sunyoung Lee, Anyang-si (KR); Sungjun Park, Anyang-si (KR); Seungjune Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 38 days.

(21) Appl. No.: 14/417,522

(22) PCT Filed: Oct. 18, 2013

(86) PCT No.: PCT/KR2013/009332
§ 371 (c)(1),
(2) Date: Jan. 26, 2015

(87) PCT Pub. No.: WO2014/069826
PCT Pub. Date: May 8, 2014

(65) Prior Publication Data
US 2015/0282125 A1 Oct. 1, 2015

Related U.S. Application Data

(60) Provisional application No. 61/721,496, filed on Nov. 2, 2012.

(51) Int. Cl.
*G06F 11/00* (2006.01)
*H04W 72/04* (2009.01)
(Continued)

(52) U.S. Cl.
CPC .......... *H04W 72/042* (2013.01); *H04L 1/1812* (2013.01); *H04L 1/1851* (2013.01);
(Continued)

(58) Field of Classification Search
CPC .......... H04W 76/048; H04W 52/0251; H04W 52/0216; H04W 52/44
See application file for complete search history.

(56) References Cited

U.S. PATENT DOCUMENTS

2008/0186892 A1* 8/2008 Damnjanovic ... H04W 52/0216
370/311
2009/0046650 A1* 2/2009 Dalsgaard ............. H04L 1/1812
370/329
(Continued)

FOREIGN PATENT DOCUMENTS

WO WO 2012/134219 A2 10/2012

OTHER PUBLICATIONS

Ericsson et al., "MAC layer support of ePDCCH", 3GPP TSG-RAN WG2 #79bis, Bratislava, Slovakia, R2-124901, Oct. 8-12, 2012, pp. 1-3.

(Continued)

*Primary Examiner* — Melanie Jagannathan
(74) *Attorney, Agent, or Firm* — Birch, Stewart, Kolasch & Birch, LLP (57) ABSTRACT

Physical downlink control channel (PDCCH) monitoring scheme considering a enhanced physical downlink control channel (ePDCCH) is disclosed. According to the present invention, when a UE receives a first ePDCCH indicating a downlink transmission at subframe 'n' from a network, even though processes the received first ePDCCH until subframe 'n+m', wherein m is not 0, the UE is configured to monitor a second ePDCCH or a PDCCH from subframe 'n+Xrtt', where 'Xrtt' corresponds to a value of a Hybrid Automatic Repeat Request Retransmission timer (HARQ RTT timer).

6 Claims, 12 Drawing Sheets

(51) Int. Cl.
*H04L 1/18* (2006.01)
*H04L 12/26* (2006.01)
*H04L 1/16* (2006.01)

(52) U.S. Cl.
CPC ..... *H04L 43/0864* (2013.01); *H04W 72/0446* (2013.01); *H04L 1/1671* (2013.01)

(56) References Cited

U.S. PATENT DOCUMENTS

| | | | | |
|---|---|---|---|---|
| 2009/0180427 | A1* | 7/2009 | Kuo | H04L 1/1851 370/328 |
| 2009/0181670 | A1* | 7/2009 | Tseng | H04W 76/048 455/434 |
| 2009/0285141 | A1* | 11/2009 | Cai | H04W 52/0251 370/311 |
| 2010/0110897 | A1* | 5/2010 | Chun | H04L 43/0811 370/241 |
| 2011/0026625 | A1* | 2/2011 | Susitaival | H04W 52/0251 375/260 |
| 2011/0205928 | A1 | 8/2011 | Pelletier et al. | |
| 2011/0237266 | A1* | 9/2011 | Cai | H04W 76/048 455/450 |
| 2012/0014306 | A1* | 1/2012 | Pelletier | H04W 76/048 370/311 |
| 2014/0071860 | A1* | 3/2014 | Susitaival | H04W 52/0216 370/280 |
| 2014/0211673 | A1* | 7/2014 | Lu | H04W 52/0212 370/311 |

OTHER PUBLICATIONS

Intel Corporation, "DRX operation for ePDCCH", 3GPP TSG-RAN2 Meeting #79, R2-123977, Qingdao, China, Aug. 13-17, 2012, 2 pages.

* cited by examiner

(a) contol - plane protocol stack (b) user - plane protocol stack

PDCCH MONITORING SCHEME CONSIDERING EPDCCH

CROSS REFERENCE TO RELATED APPLICATIONS

This application is the National Phase of PCT/KR2013/009332 filed on Oct. 18, 2013, which claims priority under 35 U.S.C. 119(e) to U.S. Provisional Application No. 61/721,496 filed on Nov. 2, 2012, all of which are incorporated by reference herein in its entirety.

TECHNICAL FIELD

The present invention relates to a wireless communication system, and more particularly, to methods for a physical downlink control channel (PDCCH) monitoring considering a enhanced physical downlink control channel (ePDCCH) and apparatuses therefor.

BACKGROUND ART

As an example of a wireless communication system to which the present invention is applicable, a 3rd generation partnership project (3GPP) long term evolution (LTE) communication system will be schematically described.

Figure 1:
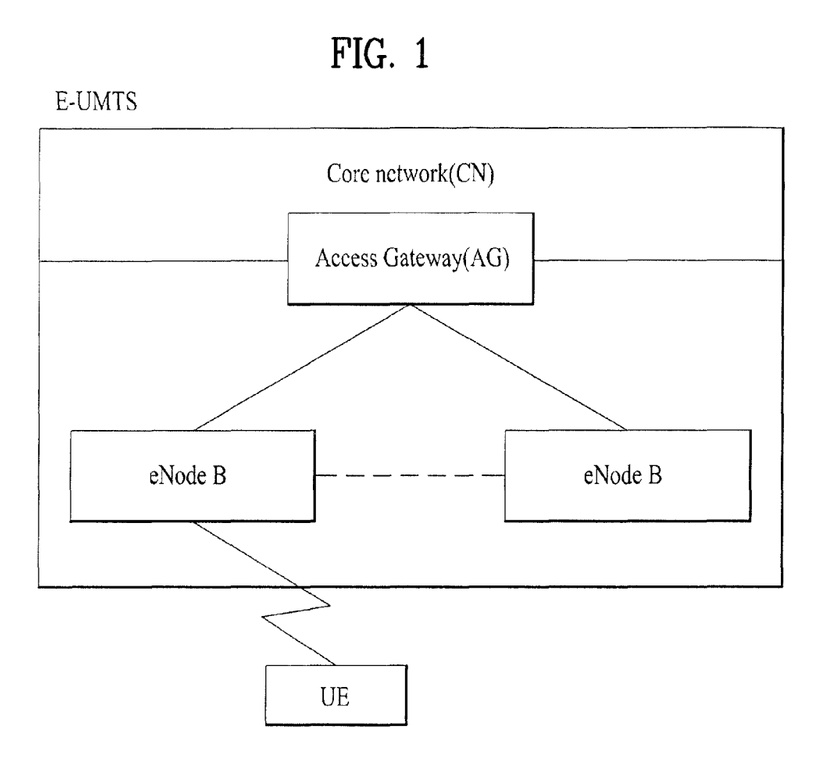
FIG. 1 is a diagram showing a network structure of an Evolved Universal Mobile Telecommunications System (E-UMTS) as an example of a wireless communication system.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL, data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

Accordingly, the present invention is directed to methods for PDCCH monitoring considering ePDCCH and apparatuses therefor that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for a user equipment (UE) to operate in a wireless communication system is provided. The method comprises: receiving a first Enhanced Physical Downlink Control Channel (ePDCCH) indicating a downlink transmission at subframe 'n' from a network; processing the received first ePDCCH until subframe 'n+m', wherein 'm' is not equal to 0; and monitoring a second ePDCCH or a Physical Downlink Control Channel (PDCCH) from subframe 'n+Xrtt', wherein 'Xrtt' corresponds to a value of a Hybrid Automatic Repeat Request (HARQ) Round Trip Time (RTT) timer.

At subframe 'n+m', the UE may consider the HARQ RTT timer started from subframe 'n'. The HARQ RTT timer may expire at subframe 'n+Xrtt'.

The UE may set another value of HARQ RTT timer for the ePDCCH as 'Xrtt−m', and the UE may start the HARQ RTT timer with the value of 'Xrtt−m' from subframe 'n+m'.

Here, the above processing the received first ePDCCH may comprise decoding the first ePDCCH.

In another aspect of the present invention, a user equipment (UE) operating in a wireless communication system is provided. The UE comprises: a transceiver configured to receive a first ePDCCH indicating a downlink transmission at subframe 'n' from a network; and a processor connected to the transceiver and configured to process the received first ePDCCH until subframe 'n+m', wherein 'm' is not equal to 0, and monitor a second ePDCCH or a PDCCH from subframe 'n+Xrtt', wherein 'Xrtt' corresponds to a value of an HARQ RRT timer.

At subframe 'n+m', the processor may consider the HARQ RTT timer started from subframe 'n'. And, The HARQ RTT timer may expire at subframe 'n+Xrtt'.

The processor may set another value of HARQ RTT timer for the ePDCCH as 'Xrtt−m', and the processor may start the HARQ RTT timer with the value of 'Xrtt−m' from subframe 'n+m'.

Here, the processor may be further configured to decode the first ePDCCH as the processing the first ePDCCH.

Advantageous Effects

According to embodiments of the present invention, the network and the user equipment can efficiently transmit and receive signals in a wireless communication system.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 2:
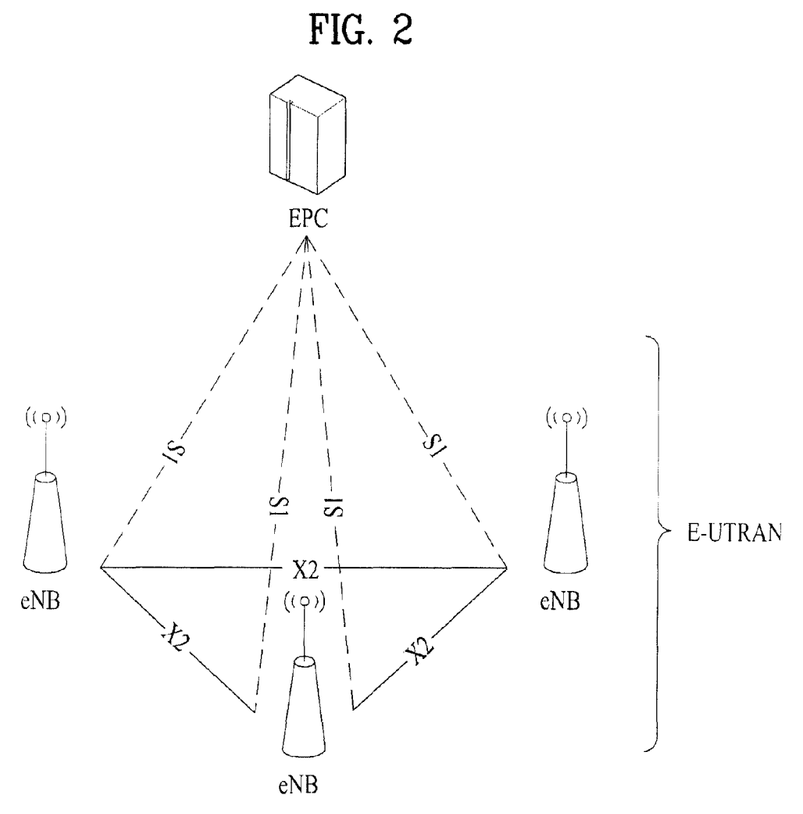
FIG. 2 is a diagram conceptually showing a network structure of an evolved universal terrestrial radio access network (E-UTRAN).

FIG. 2 is a diagram conceptually showing a network structure of an evolved universal terrestrial radio access network (E-UTRAN). An E-UTRAN system is an evolved form of a legacy UTRAN system. The E-UTRAN includes cells (eNB) which are connected to each other via an X2 interface. A cell is connected to a user equipment (UE) via a radio interface and to an evolved packet core (EPC) via an S1 interface.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
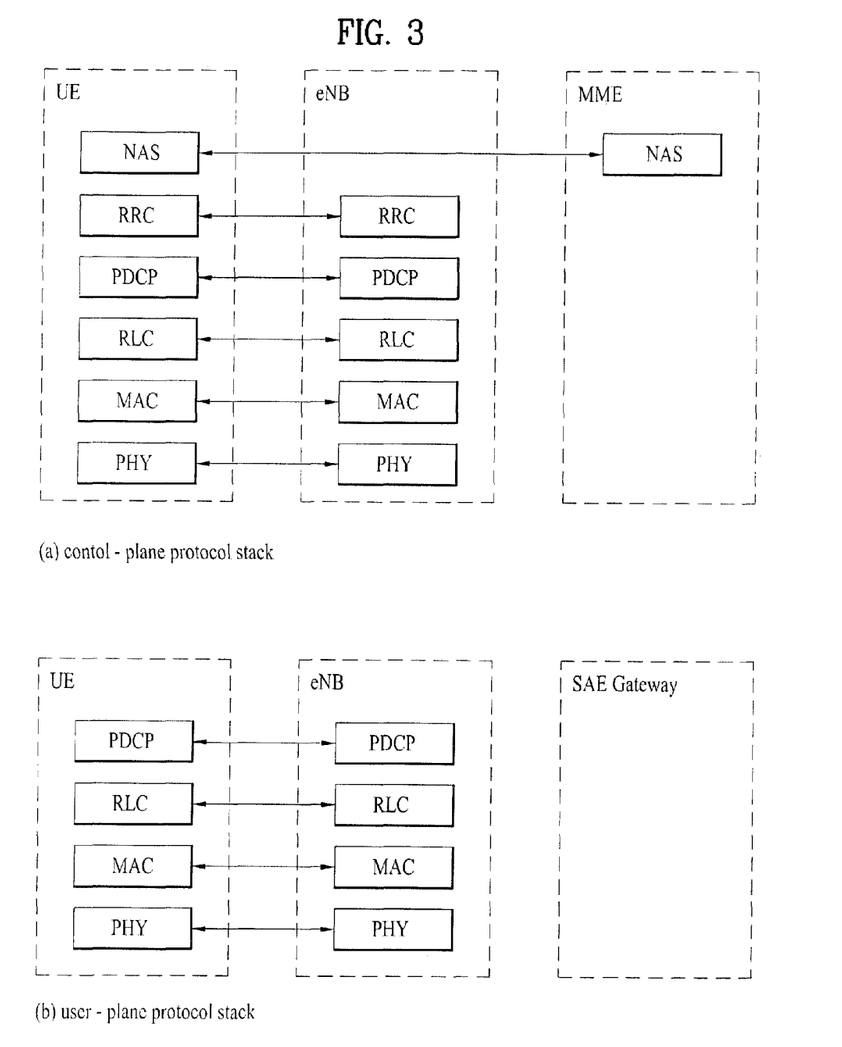
FIG. 3 is a diagram showing a control plane and a user plane of a radio interface protocol between a UE and an E-UTRAN based on a 3rd generation partnership project (3GPP) radio access network standard.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
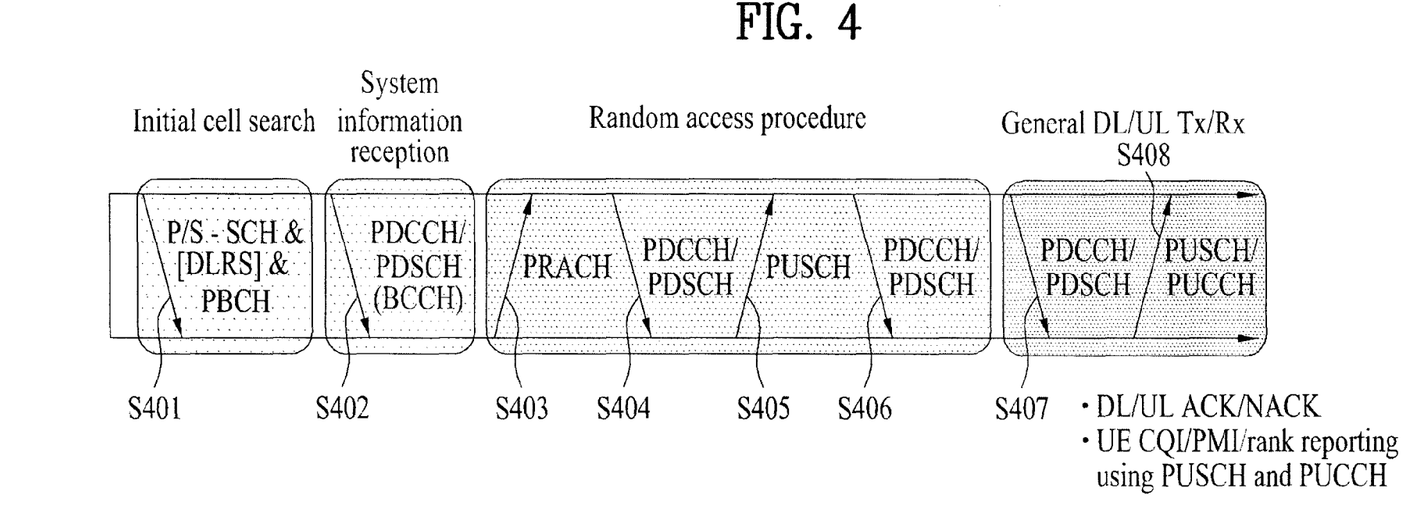
FIG. 4 is a diagram showing physical channels used in a 3GPP system and a general signal transmission method using the same.

FIG. 4 is a diagram showing physical channels used in a 3GPP system and a general signal transmission method using the same.

When a UE is powered on or enters a new cell, the UE performs an initial cell search operation such as synchronization with an eNB (S401). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S402).

When the UE initially accesses the eNB or has no radio resources for signal transmission, the UE may perform a random access procedure (RACH) with respect to the eNB (steps S403 to S406). To this end, the UE may transmit a specific sequence as a preamble through a physical random access channel (PRACH) (S403) and receive a response message to the preamble through the PDCCH and the PDSCH corresponding thereto (S404). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S408), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 5:
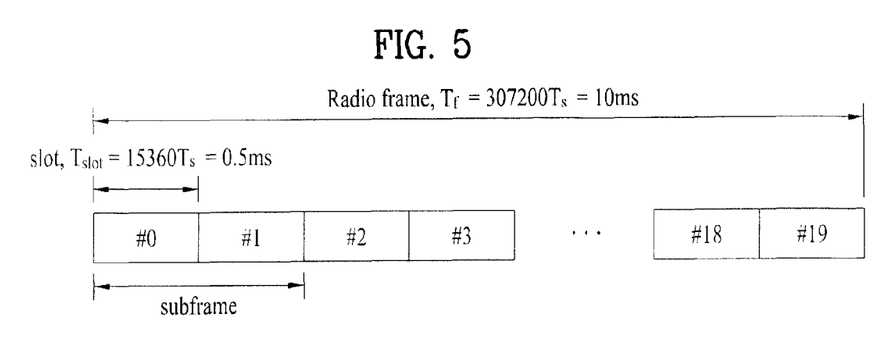
FIG. 5 is a diagram showing the structure of a radio frame used in a Long Term Evolution (LTE) system.

FIG. 5 is a diagram showing the structure of a radio frame used in an LTE system.

Referring to FIG. 5, the radio frame has a length of 10 ms ($327200 \times T_s$) and is divided into 10 subframes having the same size. Each of the subframes has a length of 1 ms and includes two slots. Each of the slots has a length of 0.5 ms ($15360 \times T_s$). Ts denotes a sampling time, and is represented by $T_s=1/(15 \text{ kHz} \times 2048)=3.2552 \times 10^{-8}$ (about 33 ns). Each of the slots includes a plurality of OFDM symbols in a time domain and a plurality of Resource Blocks (RBs) in a frequency domain. In the LTE system, one RB includes 12 subcarriers×7 (or 6) OFDM symbols. A transmission time interval (TTI) that is a unit time for transmission of data may be determined in units of one or more subframes. The structure of the radio frame is purely exemplary and thus the number of subframes included in the radio frame, the number of slots included in a subframe, or the number of OFDM symbols included in a slot may be changed in various ways.

Figure 6:
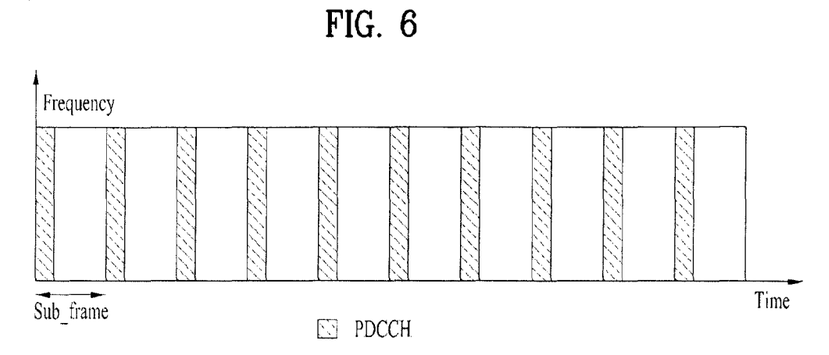
FIG. 6 shows a structure of physical downlink control channel in LTE system.

FIG. 6 shows a structure of physical downlink control channel in LTE system.

As shown in FIG. 6, for FDD, each subframe includes a PDCCH. The PDCCH takes first 1, 2 or 3 OFDM symbols in each subframe as configured and indicated by a network. Within the PDCCH, various control information is transmitted.

Figure 7:
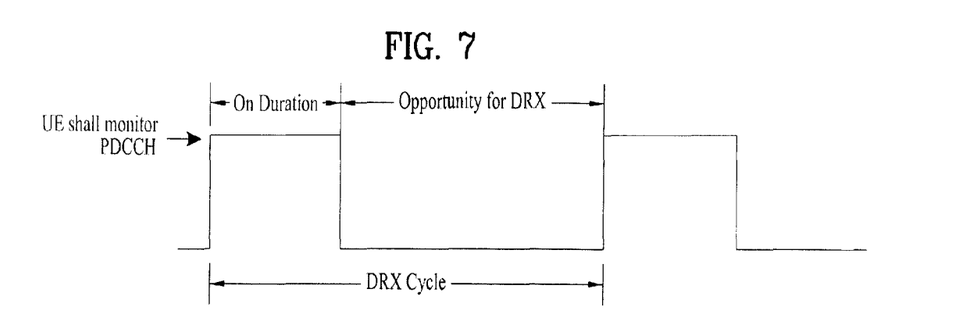
FIG. 7 is a diagram showing a concept DRX (Discontinuous Reception).

FIG. 7 is a diagram showing a concept DRX (Discontinuous Reception).

Referring to FIG. 7, if DRX is set for a UE in RRC_CONNECTED state, the UE attempts to receive a downlink channel, PDCCH, that is, performs PDCCH monitoring only during a predetermined time period, while the UE does not perform PDCCH monitoring during the remaining time period. A time period during which the UE should monitor a PDCCH is referred to as "On Duration". One On Duration is defined per DRX cycle. That is, a DRX cycle is a repetition period of On Duration.

The UE always monitors a PDCCH during On Duration in one DRX cycle and a DRX cycle determines a period in which On Duration is set. DRX cycles are classified into a long DRX cycle and a short DRX cycle according to the periods of the DRX cycles. The long DRX cycle may minimize the battery consumption of a UE, whereas the short DRX cycle may minimize a data transmission delay.

When the UE receives a PDCCH during On Duration in a DRX cycle, an additional transmission or a retransmission may take place during a time period other than the On Duration. Therefore, the UE should monitor a PDCCH during a time period other than the On Duration. That is, the UE should perform PDCCH monitoring during a time period over which an inactivity managing timer, drx-InactivityTimer or a retransmission managing timer, drx-RetransmissionTimer as well as an On Duration managing timer, onDurationTimer is running.

The value of each of the timers is defined as the number of subframes. The number of subframes is counted until the value of a timer is reached. If the value of the timer is satisfied, the timer expires. The current LTE standard defines drx-InactivityTimer as a number of consecutive PDCCH-subframes after successfully decoding a PDCCH indicating an initial UL or DL user data transmission and defines drx-RetransmissionTimer as a maximum number of consecutive PDCCH-subframes for as soon as a DL retransmission is expected by the UE.

Additionally, the UE should perform PDCCH monitoring during random access or when the UE transmits a scheduling request and attempts to receive a UL grant.

A time period during which a UE should perform PDCCH monitoring is referred to as an Active Time. The Active Time includes On Duration during which a PDCCH is monitored periodically and a time interval during which a PDCCH is monitored upon generation of an event.

More specifically, the Active Time includes the time while (1) onDurationTimer or drx-InactivityTimer or drx-RetransmissionTimer or mac-ContentionResolutionTimer is running, or (2) a Scheduling Request is sent on PUCCH and is pending, or (3) an uplink grant for a pending HARQ retransmission can occur and there is data in the corresponding HARQ buffer, or (4) a PDCCH indicating a new transmission addressed to the C-RNTI of the UE has not been received after successful reception of a Random Access Response for the preamble not selected by the UE.

Figure 8:
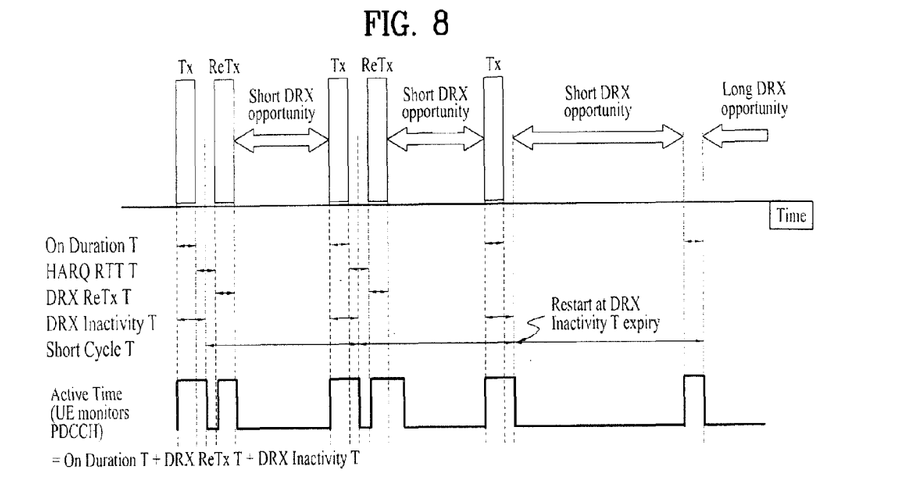
FIG. 8 is a diagram showing a method for a DRX operation in the LTE system.

FIG. 8 is a diagram showing a method for a DRX operation in the LTE system.

Referring to FIG. 8, the UE may be configured by RRC with a DRX functionality and shall perform following operations for each TTI (that is, each subframe).

If a HARQ RTT (Round Trip Time) Timer expires in this subframe and the data of the corresponding HARQ process was not successfully decoded, the UE shall start the drx-RetransmissionTimer for the corresponding HARQ process.

Further, if a DRX Command MAC control element (CE) is received, the UE shall stop onDurationTimer and drx-InactivityTimer. The DRX Command MAC CE is a command for shifting to a DRX state, and is identified by a LCID (Logical Channel ID) field of a MAC PDU (Protocol Data Unit) subheader.

Further, in case that drx-InactivityTimer expires or a DRX Command MAC CE is received in this subframe, if the Short DRX cycle is configured, the UE shall start or restart drxShortCycleTimer, and use the Short DRX Cycle. However, if the Short DRX cycle is not configured, the Long DRX cycle is used. Additionally, if drxShortCycleTimer expires in this subframe, the Long DRX Cycle is also used.

Furthermore, if the Short DRX Cycle is used and [(SFN*10)+subframe number] modulo (shortDRX-Cycle) is (drxStartOffset) modulo (shortDRX-Cycle), or if the Long DRX Cycle is used and [(SFN*10)+subframe number] modulo (longDRX-Cycle) is drxStartOffset, the UE shall start onDurationTimer.

The UE shall monitor the PDCCH for a PDCCH-subframe during the Active Time. If the PDCCH indicates a DL transmission or if a DL assignment has been configured for this subframe, the UE shall start the HARQ RTT Timer for the corresponding HARQ process and stop the drx-RetransmissionTimer for the corresponding HARQ process. If the PDCCH indicates a (DL or UL) new transmission, the UE shall start or restart drx-InactivityTimer.

Here, the PDCCH-subframe is defined as a subframe with PDCCH. That is, the PDCCH-subframe is a subframe on which the PDCCH can be transmitted. More specifically, in a FDD (frequency division duplex) system, the PDCCH-subframe represents any subframe. For full-duplex TDD (time division duplex) system, the PDCCH-subframe represents the union of downlink subframes and subframes including DwPTS of all serving cells, except serving cells that are configured with schedulingCellId (that is, the Scheduled cell). Here, the schedulingCellId indicates an identity of the scheduling cell. Further, for half-duplex TDD system, the PDCCH-subframe represents the subframes where the PCell (primary cell) is configured as a downlink subframe or a subframe including DwPTS.

Meanwhile, when not in Active Time, the UE does not perform a SRS (Sounding Reference Signal) transmission and a CSI reporting, which are triggered by the eNB.

During the above DRX operation, only the HARQ RTT Timer is fixed to 8 ms, whereas the eNB indicates the other timer values, onDurationTimer, drx-InactivityTimer, drx-RetransmissionTimer, and mac-ContentionResolutionTimer to the UE by an RRC signal. The eNB also indicates a long DRX cycle and a short DRX cycle, which represent the period of a DRX cycle, to the UE by an RRC signal.

Figure 9:
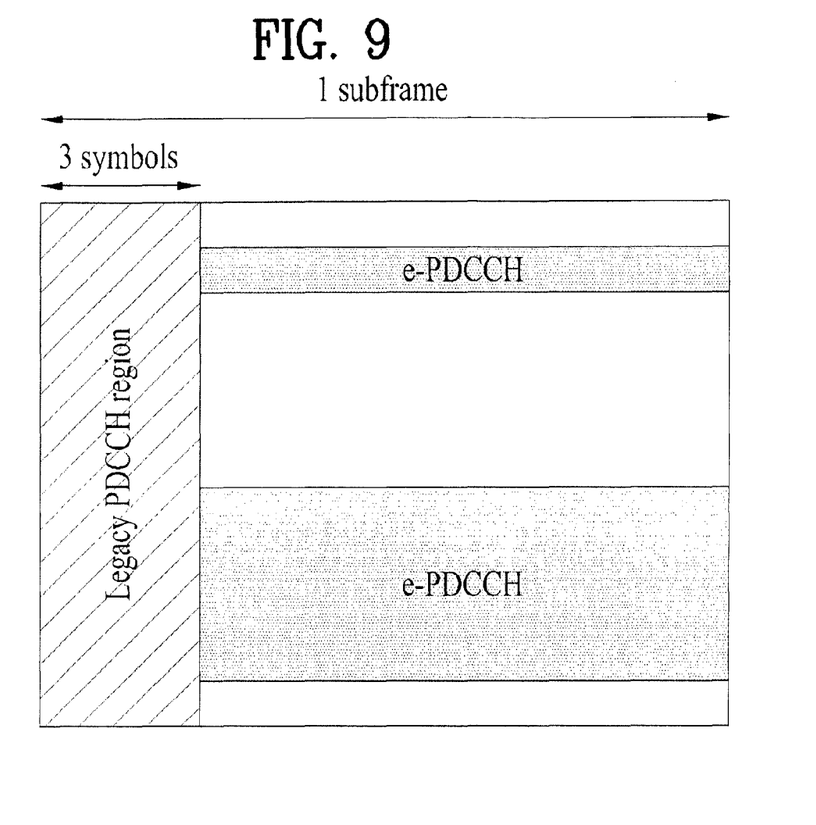
FIG. 9 shows a structure of physical channels including ePDCCH.

FIG. 9 shows a structure of physical channels including ePDCCH.

In current technical standard, ePDCCH is introduced for Rel-11 in order to schedule UL/DL data transmission. The eNB configures ePDCCH by RRC signalling and the UE shall monitor ePDCCH for UL/DL scheduling assignments. Unlike legacy PDCCH, ePDCCH spans one subframe as shown in FIG. 9. Therefore, the UE cannot know the decoding result of ePDCCH at least until the next subframe after receiving ePDCCH.

When the UE is configured with DRX, the UE saves power consumption by discontinuously monitoring the PDCCH indicating UL or DL data transmission. The DRX operation is specified by the DRX-config IE in the RRC signalling, which includes onDurationTimer, drx-InactivityTimer, drx-RetransmissionTimer, drxStartOffset, short-DRX-cycle, and drxShortCycleTimer. The value of DRX related timers are configured by RRC signalling considering the traffic and scheduling policy.

Figure 10:
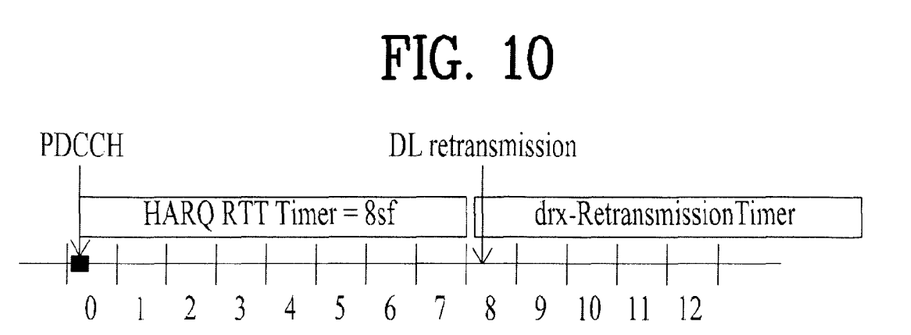
FIG. 10 is a diagram for explaining the operation with HARQ RTT timer.

FIG. 10 is a diagram for explaining the operation with HARQ RTT timer.

If the UE receives PDCCH indicating UL/DL data transmission during the Active Time, the UE starts the HARQ RTT Timer for the corresponding HARQ process. In current MAC specification, the HARQ RTT Timer is set to 8 subframes for FDD and set to k+4 subframes for TDD, where k is the interval between the downlink transmission and the transmission of associated HARQ feedback. The fixed timer value aims at starting monitoring PDCCH from 8 subframes after receiving PDCCH indicating UL/DL data transmission.

Figure 11:
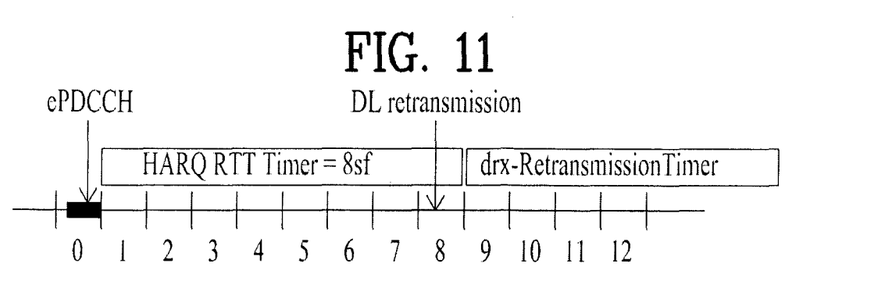
FIG. 11 is a diagram for explaining a problem with regards to ePDCCH.

FIG. 11 is a diagram for explaining a problem with regards to ePDCCH.

For ePDCCH, as there is at least one subframe delay of knowing the decoding result, the HARQ RTT Timer cannot start in the subframe where the DE receives ePDCCH indicating UL/DL data transmission. If the UE starts HARQ RTT Timer in the subframe where the UE knows the decoding result of ePDCCH (e.g. 1 subframe later), it is problematic that the UE cannot monitor PDCCH or ePDCCH for the DL retransmission in the subframe which is 8 subframes after the UE receives ePDCCH.

In current specification, there is no way to make the UE monitor the PDCCH or ePDCCH for the DL retransmission after the configured subframes of HARQ RTT Timer if the UE receives ePDCCH indicating a DL transmission.

Therefore, in one embodiment of the present invention, when the UE starts the HARQ RTT Timer upon decoding the ePDCCH indicating a DL transmission, the UE monitors the DL scheduling assignment for DL retransmission in the subframe where the DL retransmission is expected by the UE considering the decoding delay of ePDCCH.

That is, when a UE receives a first ePDCCH indicating a downlink transmission at subframe 'n' from a network, the UE processes the received first ePDCCH until subframe 'n+m', where 'm' is not 0. However, according to the present embodiment, the UE monitor the second ePDCCH or a legacy PDCCH from subframe 'n+Xrtt', where 'Xrtt' corresponds to a value of HARQ RTT timer. This can be achieved (1) by configuring the UE to consider the HARQ RTT timer started earlier (started from subframe 'n', even though the processing is finished at subframe 'n+m'), (2) by configuring the UE to consider the HARQ RTT timer is expired earlier (expired at subframe 'n+m' even though the HARQ RRT timer value remains), or (3) by configuring the UE to apply different HARQ RTT timer values to PDCCH and ePDCCH.

These schemes shall be described based on the following assumptions.

HARQ RTT Timer for PDCCH is $X_{rtt}$ (subframe), i.e. if HARQ RTT Timer starts at subframe n, then the timer expires at subframe $n+X_{rtt}$. For FDD, $X_{rtt}$ is 8 subframes, and for TDD, $X_{rtt}$ is k+4 subframes where k is the interval between the downlink transmission and the transmission of associated HARQ feedback.

Decoding delay for ePDCCH is set to 'm' (subframe), i.e. if ePDCCH is received at subframe 'n', then the decoding result is obtained at subframe 'n+m'. Typically, 'm' is 1 subframe.

EMBODIMENT 1

For ePDCCH, the UE Considers that HARQ RTT Timer Started Earlier

The eNB configures the UE with ePDCCH by RRC signalling.

The UE monitors ePDCCH in the Active Time.

The UE receives the ePDCCH in subframe n.

The UE completes decoding the ePDCCH in subframe n+m.

In subframe 'n+m', if the ePDCCH indicates a DL data transmission, the UE considers that the HARQ RTT Timer started 'm' subframes before the UE completes decoding ePDCCH, i.e., in subframe n, with the timer value set to $X_{rtt}$.

In subframe $n+X_{rtt}$, when the HARQ RTT Timer expires, the UE starts the drx-RetransmissionTimer for the corresponding HARQ process.

EMBODIMENT 2

For ePDCCH, the UE Expires HARQ RTT Timer Earlier

The eNB configures the UE with ePDCCH by RRC signalling.

The UE monitors ePDCCH in the Active Time.

The UE receives the ePDCCH in subframe n.

The UE completes decoding the ePDCCH in subframe n+m.

The UE starts HARQ RTT Timer in subframe n+m with the timer value set to $X_{rtt}$.

In subframe $n+X_{rtt}$, the UE considers that the HARQ RTT Timer expires earlier than the original expiry time of subframe $n+m+X_{rtt}$. Then, the UE starts the drx-RetransmissionTimer for the corresponding HARQ process.

EMBODIMENT 3

The UE Applies Different HARQ RTT Timer Values to PDCCH and ePDCCH

The eNB configures the UE with ePDCCH by RRC signalling.

For ePDCCH, the UE sets HARQ RTT Timer to $X_{ertt}=X_{rtt}-m$.

The UE monitors ePDCCH in the Active Time.

The UE receives the ePDCCH in subframe n.

The UE completes decoding the ePDCCH in subframe n+M.

The UE starts HARQ RTT Timer in subframe n+M with the timer value set to $X_{ertt}$.

In subframe $n+M+X_{ertt}=n+X_{rtt}$, the UE considers the HARQ RTT Timer expires. And, the UE starts the drx-RetransmissionTimer for the corresponding HARQ process.

Consideration on Multiple HARQ RTT Timers Associated with each HARQ Process

When a wireless communication system uses HARQ operation, multiple HARQ processes under the control of a HARQ entity are defined. For example, in LTE-A system, there are 8 HARQ processes under the control of one HARQ entity for each cell. Each of the HARQ processes responsible for DL/UL transmission at specific timing. For example of 8 HARQ processes, HARQ process 1 is responsible for DL/UL transmission at subframe 1, HARQ process 2 is responsible for DL/UL transmission at subframe 2, . . . , HARQ process 1 is also responsible for DL/UL transmission at subframe 9, etc.

Multiple HARQ RTT timers are defined per each of the DL HARQ processes. According to the current version of the standard, starting the HARQ RTT timer is for the corresponding HARQ process. Each of the HARQ processes' responsibility depends on the reception timing of the DL signal (e.g. ePDCCH).

Based on this consideration, it seems that the above embodiment 1 is appropriate for ePDCCH reception. It is better to configured such that each HARQ RTT timer corresponding to each HARQ process shall be started with regards to the reception timing of ePDCCH regardless of processing/decoding delay of ePDCCH.

In order to operate LTE-A system, the following physical channels shall be defined.

Physical Downlink Shared Channel, PDSCH
Physical Broadcast Channel, PBCH
Physical Multicast Channel, PMCH
Physical Control Format Indicator Channel, PCFICH
Physical Downlink Control Channel, PDCCH
Physical Hybrid ARQ Indicator Channel, PHICH
Enhanced Physical Downlink Control Channel, EPDCCH The ePDCCH can be treated as a specific kind of PDCCH, and the processing of the PDCCH can be applied to ePDCCH, if not inappropriate.

Figure 12:
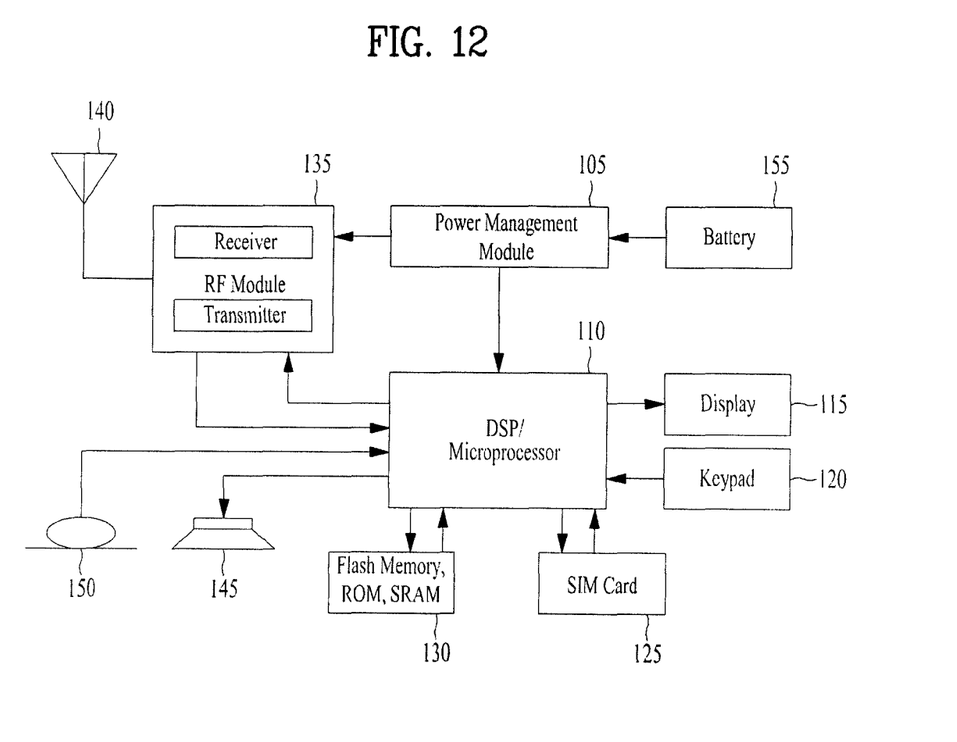
FIG. 12 is a block diagram of a communication apparatus according to an embodiment of the present invention.

FIG. 12 is a block diagram of a communication apparatus according to an embodiment of the present invention.

The apparatus shown in FIG. 12 can be a user equipment (UE) and/or eNB adapted to perform the above mechanism, but it can be any apparatus for performing the same operation.

As shown in FIG. 12, the apparatus may comprises a DSP/microprocessor (110) and RF module (transmiceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 12 may represent a UE comprising a transceiver (135) configured to receive an ePDCCH (Enhanced Physical Downlink Control Channel) from a network and a processor (110) connected to the transceiver (135) and configured to process the received ePDCCH for 'm' subframes. In this case, we assume that 'm' is not 0.

According to one embodiment of the present invention, when a first ePDCCH indicating a downlink transmission is received at subframe 'n', the processor (110) controls the transceiver to monitor a second ePDCCH or a PDCCH from subframe 'n+Xrtt'. Here, 'Xrtt' corresponds to a value of HARQ RTT timer.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) to operate in a wireless communication system, the method comprising:
   receiving a first Enhanced Physical Downlink Control Channel (ePDCCH) indicating a downlink transmission at subframe 'n' from a network;
   processing the received first ePDCCH until subframe 'n+m', wherein 'm' is not equal to 0; and
   monitoring a second ePDCCH or a Physical Downlink Control Channel (PDCCH) from subframe 'n+Xrtt',
   wherein 'Xrtt' corresponds to a value of a Hybrid Automatic Repeat Request (HARQ) Round Trip Time (RRT) timer, and
   wherein, at subframe 'n+m', the UE considers that the HARQ RTT timer started from subframe 'n'.

2. The method of claim 1, wherein the HARQ RTT timer expires at the subframe 'n+Xrtt'.

3. The method of claim 1, wherein processing the received first ePDCCH comprises decoding the first ePDCCH.

4. A user equipment (UE) operating in a wireless communication system, the UE comprising:
   a transceiver configured to receive a first Enhanced Physical Downlink Control Channel (ePDCCH) indicating a downlink transmission at subframe 'n' from a network; and
   a processor connected to the transceiver and configured to:
      process the received first ePDCCH until subframe 'n+m', wherein 'm' is not equal to 0, and
      monitor a second ePDCCH or a Physical Downlink Control Channel (PDCCH) from subframe 'n+Xrtt',
   wherein 'Xrtt' corresponds to a value of a Hybrid Automatic Repeat Request (HARQ) Round Trip Time (RTT) timer, and
   wherein, at subframe 'n+m', the processor considers that the HARQ RTT timer started from subframe 'n'.

5. The UE of claim 4, wherein the HARQ RTT timer expires at the subframe 'n+Xrtt'.

6. The UE of claim 4, wherein the processor is further configured to decode the first ePDCCH as the processing the first ePDCCH.

* * * * *